United States Patent
Hsu et al.

(10) Patent No.: US 11,108,800 B1
(45) Date of Patent: Aug. 31, 2021

(54) PENETRATION TEST MONITORING SERVER AND SYSTEM

(71) Applicant: KLICKKLACK INFORMATION SECURITY CO., LTD., Taipei (TW)

(72) Inventors: Chien-Yang Hsu, Miaoli County (TW); Ju-We Chen, Taipei (TW); Yi Lin, New Taipei (TW)

(73) Assignee: Klickklack Information Security Co., Ltd., Taipei (TW)

( * ) Notice: Subject to any disclaimer, the term of this patent is extended or adjusted under 35 U.S.C. 154(b) by 93 days.

(21) Appl. No.: 16/793,008

(22) Filed: Feb. 18, 2020

(51) Int. Cl.
*G06F 12/14* (2006.01)
*G06F 15/173* (2006.01)
*H04L 29/06* (2006.01)
*H04L 29/08* (2006.01)

(52) U.S. Cl.
CPC ...... *H04L 63/1425* (2013.01); *H04L 63/1416* (2013.01); *H04L 63/1466* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 10,757,132 B1 * | 8/2020 | Powers | H04L 63/1416 |
| 2006/0282893 A1 | 12/2006 | Wu et al. | |
| 2014/0196105 A1 * | 7/2014 | Hung | H04L 63/20 726/1 |
| 2015/0047032 A1 * | 2/2015 | Hannis | H04L 63/1416 726/23 |
| 2019/0073481 A1 * | 3/2019 | Angelino | G06F 8/65 |
| 2019/0297104 A1 * | 9/2019 | Kang | G06F 7/582 |
| 2020/0366703 A1 * | 11/2020 | Hsu | H04L 63/1466 |

FOREIGN PATENT DOCUMENTS

| | | |
|---|---|---|
| CN | 104778413 A | 7/2015 |
| JP | 2013-236687 A | 11/2013 |
| JP | 2014021959 A | 2/2014 |
| TW | 201001225 A | 1/2010 |
| TW | 201413488 A | 4/2014 |

* cited by examiner

*Primary Examiner* — Quang N Nguyen
(74) *Attorney, Agent, or Firm* — Thomas J. Nikolai; DeWitt LLP

(57) ABSTRACT

A penetration test monitoring system includes an attacking host for performing a hacking exercise on a target website; a monitoring server electrically connected to the target website and the attacking host and including a virtual platform and an analysis platform, wherein the virtual platform provides a virtual account for the attacking host to perform the hacking exercise on the target website through the virtual platform after logging in, and the analysis platform is electrically connected to the virtual platform to record the hacking exercise executed by the attacking host; and a monitoring host electrically connected to the monitoring server and the attacking host for monitoring the attacking host. The monitoring server monitors and records the attack behavior of the attacking host, thereby preventing the attacker from arbitrarily implanting virus programs during the security test and improving the protection quality during security testing.

6 Claims, 3 Drawing Sheets

PENETRATION TEST MONITORING SERVER AND SYSTEM

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

The invention relates to a penetration test monitoring server and system, in particular to a server and a system capable of monitoring attack behaviors of an attacking host during security testing.

2. Description of the Prior Arts

FIG. 3 shows a schematic diagram of a conventional security test architecture. Conventionally, when detecting whether there is a loophole in the security protection of a target website 90, the owner of the target website 90 usually invites a security company to undertake the security testing. The security company provides an attacking host 80 as a hacker to attack the target website 90, tests whether the security protection measures of the target website 90 such as the firewall are impeccable, and further generates a security report 81 that contains the test results. The security report 81 records whether there are weaknesses in the security protection measures of the target website 90, and to which kind of attack the security protection measures are more vulnerable.

However, during the test, the owner of the target website 90 normally cannot know the details of the various attack simulations conducted by the security company. Therefore, if the security company secretly implants a spyware or computer virus such as a Trojan in the target website 90 during the test, the security company can privately monitor the target website 90 or attack the target website 90 in the present or future. So the owner of the target website 90 cannot prevent the target website 90 from being arbitrarily implanted with malware during the test.

SUMMARY OF THE INVENTION

In order to prevent the target website from being interrupted or prevent the target website from being arbitrarily implanted with malware by the security company during the test, the present invention provides a penetration test monitoring system and a penetration test monitoring server. The monitoring server provides a virtual platform with login authority, the security company must log in to the virtual platform to perform a simulated attack during security testing, and the virtual platform can record all the attack instructions of the security company. Therefore, a trusted third party can monitor or check whether any malware is implanted, or the complete implementation track of the security company can be recorded, so as to clarify the responsibility and liability for inspection at a later time.

A penetration test monitoring system comprises: an attacking host for performing a hacking exercise on a target website and generating a first attack report based on results of attacks on the target website. A monitoring server is electrically connected to the target website and to the attacking host. It includes a virtual platform and an analysis platform. The virtual platform carries software tools used by the attacking host to perform the hacking exercise. It further provides a virtual account for the attacking host to perform the hacking exercise on the target website through the virtual platform after logging in. The analysis platform is electrically connected to the virtual platform and records the hacking exercise executed on the virtual platform by the attacking host and receives the first attack report. A monitoring host electrically connected to the monitoring server and the attacking host monitors the attacking host, generates a second attack report based on the results of attacks on the target website, and transmits the second attack report to the analysis platform.

A penetration test monitoring server is electrically connected to a target website and to an attacking host and a monitoring host. It comprises: a virtual platform that carries software tools used by the attacking host to perform the hacking exercise and provides a virtual account for the attacking host to perform the hacking exercise on the target website through the virtual platform after logging in. An analysis platform is electrically connected to the virtual platform for recording the hacking exercise executed on the virtual platform by the attacking host and is configured to receive a first attack report.

The monitoring server of the present invention is configured with more than one virtual machine. The attacking host must log into the virtual machine for simulated attack when performing the security test, and the virtual machines can record all the attack behaviors performed by the attacking host. This prevents the attacking host from arbitrarily implanting malware on the target website and reduces the risk of the target websites being attacked by malware implanted during security testing.

DETAILED DESCRIPTION OF THE PREFERRED EMBODIMENTS

Figure 1:
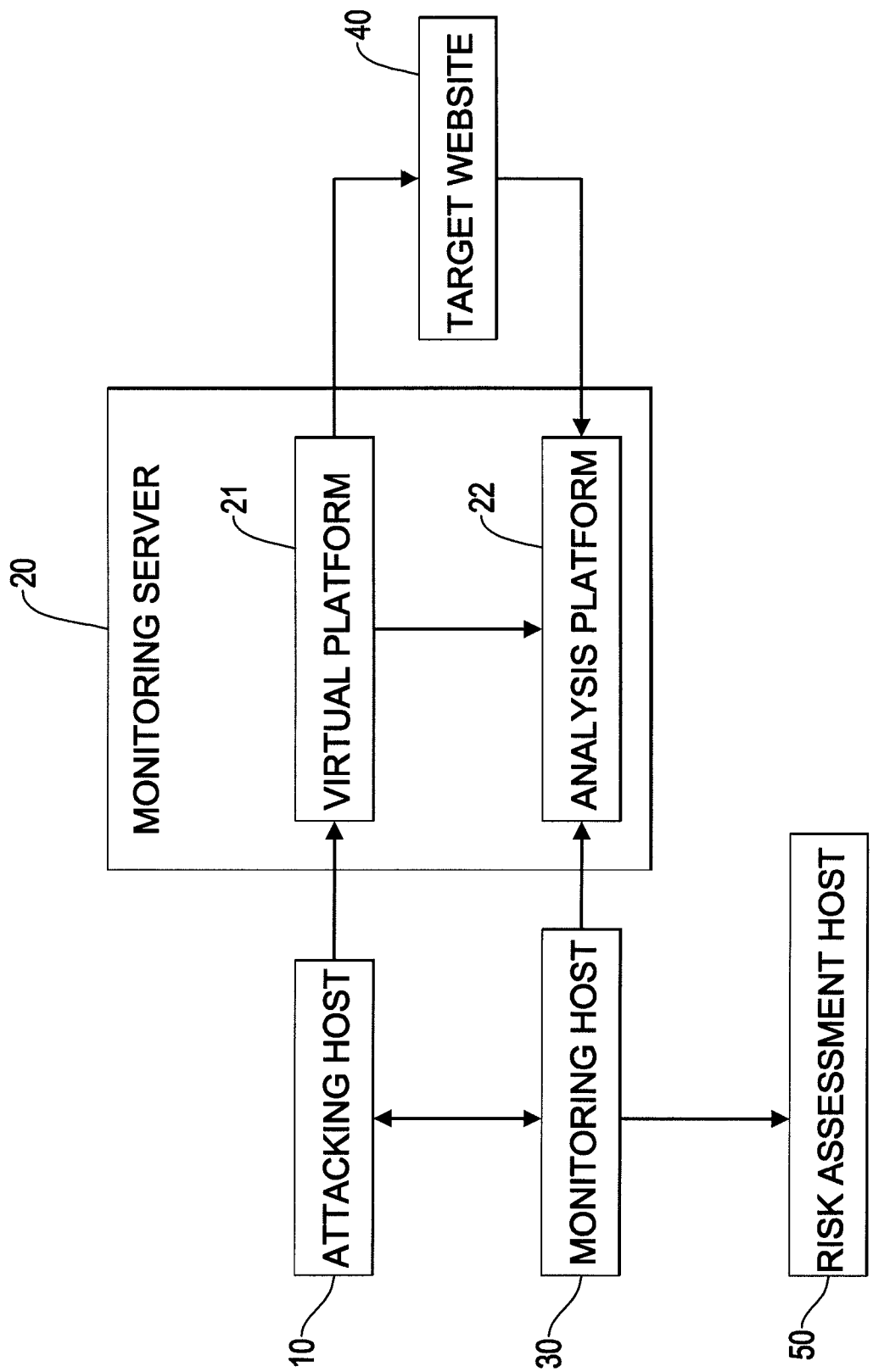
FIG. 1 is a block diagram of a circuit according to a first preferred embodiment of the present invention.

Referring to FIG. 1, a penetration test monitoring system of the present invention includes an attacking host 10, a monitoring server 20, and a monitoring host 30. In the present invention, the attacking host 10 and the monitoring host 30 can be provided by a security company, and the monitoring server 20 can be provided by the provider of a target website. In the security company, the attacking host 10 simulates hacker attacks, and the monitoring host 30 simulates the security maintenance engineer. In another embodiment, the attacking host 10 can be provided by the security company to simulate hacker attacks, and the monitoring host 30 is provided by another highly-trusted security company. The monitoring host 30 observes the attack data when the attacking host 10 attacks the target website, and generates a security report of the target website. The monitoring server 20 monitors the attack behaviors executed by the attacking host 10 at any time, thereby effectively preventing the attacking host 10 from implanting a Trojan virus or the like that may endanger the information security during the penetration test.

The attacking host 10 is configured to perform a hacking exercise on a target website 40, and generates a first attack report according to a result of an attack on the target website 40. The attacking host 10 can be a hacker or a first security company. For example, the hacking exercise can be Penetration Testing (PT) or Red Teaming.

The monitoring server 20 is electrically connected to the target website 40 and the attacking host 10, and includes a virtual platform 21 and an analysis platform 22. The virtual platform 21 carries software tools used by the attacking host 10 during the hacking exercise and provides a virtual account. The attacking host 10 needs to log into the virtual account to perform the hacking exercise on the target website 40 through the virtual platform 21. The software tools may include, but are not limited to, IBM AppScan, Netsparker, Acunetix, Probely, ImmuniWeb, Indusface, Tenable Nessus, Core Impact, Canvas, w3af, ZAP, Sqlninja, and OpenVAS. In actual operation, the virtual platform 21 performs FingerPrint feature analysis to determine which software is currently used by one or more attacks.

Figure 2:
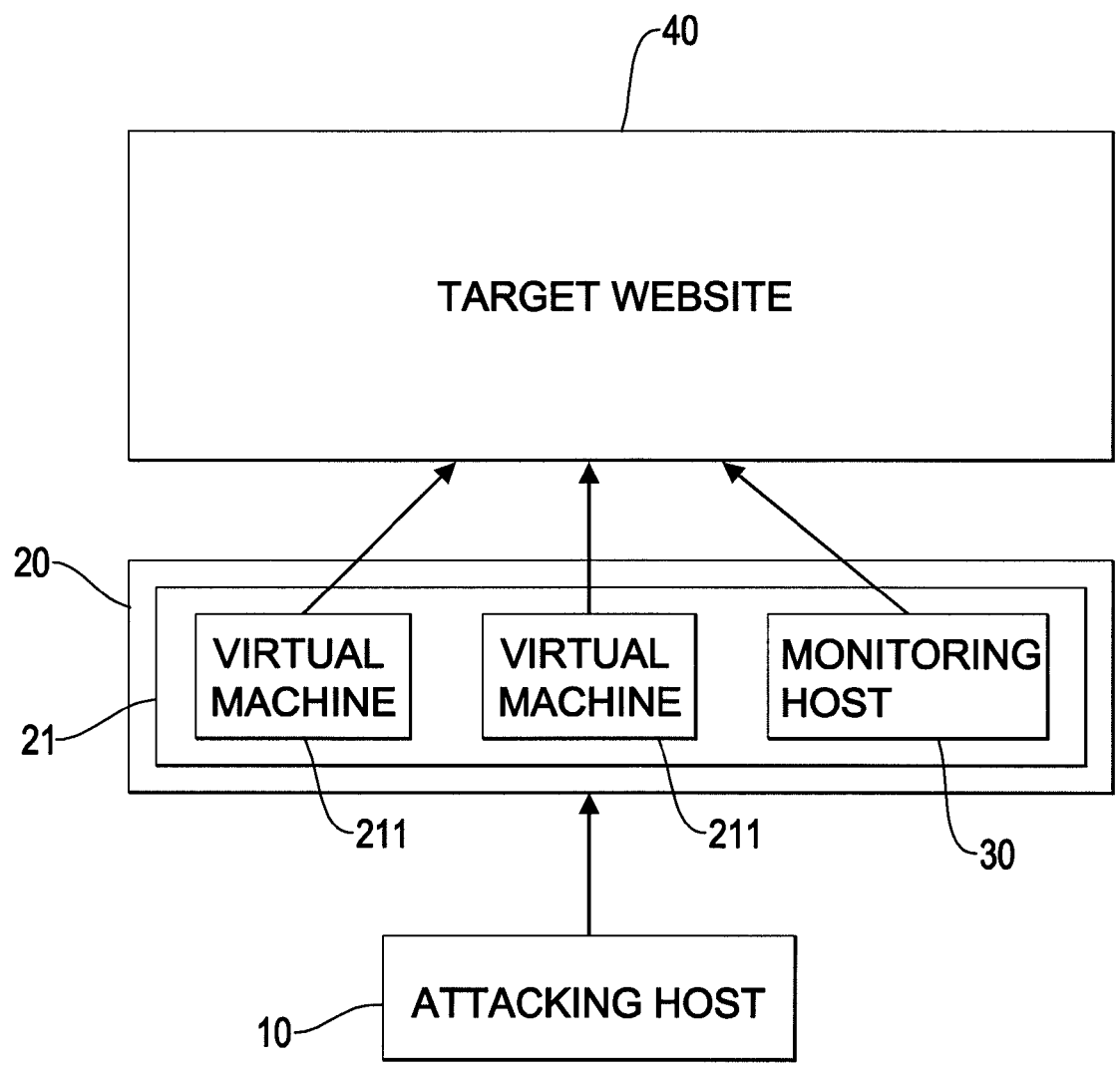
FIG. 2 is a block diagram of a circuit according to a second preferred embodiment of the present invention.
Figure 3:
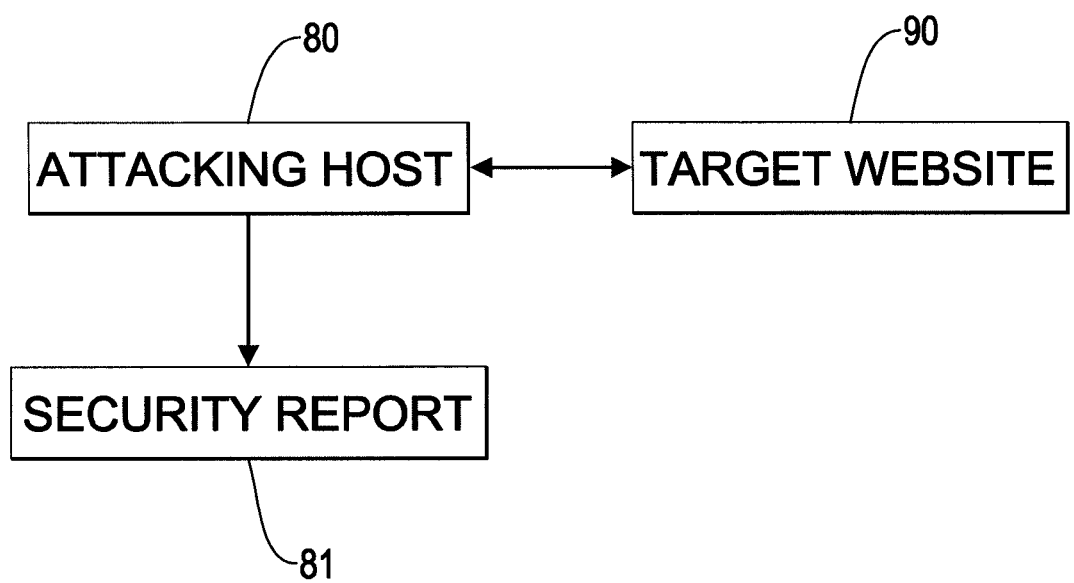
FIG. 3 is a schematic diagram of a conventional, prior art security test architecture.

Referring to FIG. 2, in a preferred embodiment, the virtual platform 21 includes one or more virtual machines (VM) 211, and the attacking host 10 logs in to said one or more virtual machines through the virtual account to perform the hacking exercise on the target website 40. The analysis platform 22 is electrically connected to the virtual platform 21 for recording the hacking exercise performed by the attacking host 10 on the virtual platform 21 and receiving the first attack report. Specifically, the first attack report may include, but is not limited to, the following two types: 1) If the attack is successful, it is classified according to previously defined attack items, which may include the details of the attack, the attack time, the attack method, the attack effect, and the severity level after the attack; 2) if the attack fails, it is classified according to the previously defined attack items, which may include the risks to which the target website 40 is exposed, but do not include the details of the attack. As the virtual platform 21 carries the software tools used by the attacking host 10 to perform the hacking exercise, the owner of the target website 40 or a third-party security company can check whether the software tools in the virtual platform 21 are tampered or virus-implanted before the security testing, thereby avoiding attacks on security testing.

Further, because the virtual platform 21 can include multiple virtual machines 211, the attacking host 10 can perform more than one hacking exercise on the target website 40 through the multiple virtual machines 211, thereby improving the level of security testing and testing how high-intensity hacking attacks the target website can withstand.

The monitoring host 30 is electrically connected to the monitoring server 20 and the attacking host 10 and is for monitoring the attacking host 10, collecting the results of attacks to the target website 40 to generate a second attack report, and transmitting the second attack report to the analysis platform 22. The monitoring host 30 may be provided by the first security company or provided by an objective third party security company. Specifically, the second attack report may include failed attacking attempts that have no effect (no risk), software used by the attack, whether the attack poses a threat, which threat is safe, etc.

The virtual platform 21 of the present invention can monitor the attacking host 10 to perform all the attacks in the hacking exercise on the target website 40, thereby preventing the attacking host 10 from secretly installing a spyware or virus such as a Trojan when attacking the target website 40 and protecting the target website 40 from being hacked by the attacking host 10 when performing a security analysis on the target website 40. Specifically, the virtual platform 21 can monitor the attack behavior in the following two ways: 1) the virtual platform 21 can be set up on physical hardware to obtain all the attack behaviors as records through the underlying network service; 2) the virtual platform 21 performs the network behavior traffic analysis of the target website 40 to analyze the content of the transmitted packets and received packets.

The invention further includes a risk assessment host 50, which is electrically connected to the monitoring host 30 for performing an After Action Review (AAR) according to the first attack report, the second attack report, and the result of the hacking exercise of the analysis platform 22. The risk assessment host 50 generates a comprehensive security report based on the results of the AAR and transmits the comprehensive security report to the owner of the target website 40. The comprehensive security report includes data such as whether the security system of the target website 40 is defective, the integrity of the firewall, the weakness of the firewall, and the like. Thereby, the invention can objectively and effectively evaluate the comprehensive report, and have beneficial effects such as enhancing team trust, security, minimum resources consumption, effective supervision, infiltrating attacks against the domain, and thoroughly simulating hacking techniques.

Further, the AAR includes:

1. A first step: based on the attack items defined above, confirming that parts of the reports independently generated by the attacking host 10, the monitoring host 30 and the target website 40 about the successful attack are different from one another, and then recording which security weaknesses the attacking host 10 attacked and comparing whether the target website 40 is at risk of being attacked in the security weaknesses and is safe in which security areas. This process can also prove that the attacking host 10 does not conceal any successful attack. Therefore, the first attack report must have more detailed disclosures than the second attack report.

2. A second step: according to the data of the first step, checking whether the information related to the security of the target website, security information and event management (SIEM) and the security monitoring center (SOC) are sufficient and effective, thereby verifying whether the daily self-recording and defense mechanism of the target website 40 is sound and effective.

Specifically, the comprehensive security report includes the first attack report, the second attack report, and a record information. The record information is generated by the virtual platform according to the summary of the network transmission content during the attack and the transmission content may include: observation, discovery, early warning, detection, interception, blocking, establishment of security incidents, follow-up processing, related record reports, etc.

Specifically, in the preferred embodiment of the present invention, the monitoring host 30 performs port mirroring according to a security protocol information (such as an SSL Access Log), and generates the second attack report after analysis. The owner of the target website 40 transmits the first attack report, the second attack report, and the record information to the risk assessment host 50. The risk assessment host 50 generates the comprehensive security report and sends the comprehensive security report to the owner of the target website 40. For example, if the target website 40 has an SSL encryption function, as the SSL uses a dynamic key by default, the monitoring server 20 cannot decrypt the SSL. Therefore, the risk assessment host 50 can generate a static key to the attacking host 10, the attacking host 10 uses the static key for SSL encryption, and the monitoring server 20 can record the whole encrypted connection between the attacking host 10 and the target website 40 in clear text. The record information includes a Security and Information Management (SIEM), an Intrusion Prevention System (IPS), an Intrusion Detection System (IDS), and a website application firewall. (Web Application Firewall, WAF) or a Web Access Log, etc.

In addition, the monitoring host 30 can be provided by the security company (for example, FIG. 1), or can be disposed in the monitoring server 20 (for example, FIG. 2) to observe the attacking host 10 performing the hacking exercise.

In the present invention, the attacking host 10 performs the hacking exercise on the target website 40 through the monitoring server 20, and the attacking host 10 is monitored by the monitoring host 30. The attacking host 10 and the monitoring host 30 generate the first attack report and the second attack report according to the hacking exercise, the target website 40 sends the first attack report and the second attack report to the analysis platform 22 for objective analysis, and the risk assessment host 50 generates the comprehensive security report. The invention can analyze the comprehensive security report in an objective and effective position, and has the advantages of enhancing team trust, security, minimum resource consumption, effective supervision, penetration attack against the domain, and thoroughly simulating the hacking technique.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A penetration test monitoring system, comprising:
   an attacking host for performing a hacking exercise that launches attacks on a target website and generating a first attack report based on results of the attacks on the target website;
   a monitoring server electrically connected to the target website and the attacking host and including:
      a virtual platform includes one or more virtual machines, wherein the virtual platform carries software tools used by the attacking host to perform the hacking exercise and provides a virtual account for the attacking host to perform the hacking exercise on the target website through the virtual platform after logging in to said one or more virtual machines through the virtual account; and
      an analysis platform electrically corrected to the virtual platform, recording the hacking exercise executed on the virtual platform by the attacking host, and receiving the first attack report;
   a monitoring host electrically connected to the monitoring server and the attacking host, monitoring the attacking host, generating a second attack report based on the results of the attacks on the target website, and transmitting the second attack report to the analysis platform; and
   a risk assessment host that is electrical connected to the monitoring host, performing an After Action Review (AAR) according to the first attack report, the second attack report, and the results of the hacking exercise, and generating a comprehensive security report based on results of the AAR.

2. The penetration test monitoring system as claimed in claim 1, wherein the comprehensive security report is generated by the risk assessment host according to the first attack report, the second attack report, and record information, wherein, the record information is generated by the virtual platform according to network transmission contents during the hacking exercise.

3. The penetration test monitoring, system as claimed in claim 2, wherein the monitoring host is set in the monitoring server.

4. The penetration test monitoring system as claimed in claim 3, wherein the second attack report is generated by the monitoring host after port mirroring and analysis according to a security protocol.

5. A penetration test monitoring server, electrically connected to a target website and an attacking host and a monitoring host, the server comprising:
   a virtual platform includes one or more virtual machines, wherein the virtual platform carrying software tools used by the attacking host to perform a hacking exercise and providing a virtual account for the attacking host to perform the hacking exercise on the target website through the virtual platform after logging in to said one or more virtual machines through the virtual account;
   an analysis platform electrically connected to the virtual platform for recording the hacking exercise executed on the virtual platform by the attacking host and receiving a first attack report;
   wherein the penetration test monitoring server is connected to a risk assessment host through the monitoring host, and the risk assessment host performs an After Action Review (AAR) according to the first attack report, a second attack report, and results of the hacking exercise, and generates a comprehensive security report based on results of the AAR.

6. The penetration test monitoring server as claimed in claim 5, wherein the AAR includes:
   step one: determining whether successful attacks recorded in the reports respectively generated by the attacking host, the monitoring host and the target website are different from one another, recording security weaknesses that the attacking host attacks, and comparing whether the target website is at risk of being attacked in the security weaknesses;
   step two: according to data of step one, checking whether the information related to the security of the target website, security information and event management (SIEM) and the security monitoring center (SOC) are sufficient and effective.

* * * * *